US012761718B2

(12) United States Patent
Fang et al.

(10) Patent No.: US 12,761,718 B2
(45) Date of Patent: Oct. 13, 2026

(54) MANAGEMENT SYSTEM FOR PROVISIONING SERVER RESOURCES OF A DATA CENTER

(71) Applicant: Super Micro Computer, Inc., San Jose, CA (US)

(72) Inventors: Cheng-Yi Fang, New Taipei City (TW); Chih Chia Huang, New Taipei City (TW)

(73) Assignee: Super Micro Computer, Inc.

(*) Notice: Subject to any disclaimer, the term of this patent is extended or adjusted under 35 U.S.C. 154(b) by 126 days.

(21) Appl. No.: 18/739,867

(22) Filed: Jun. 11, 2024

(65) Prior Publication Data

US 2025/0377709 A1 Dec. 11, 2025

(51) Int. Cl.
*G06F 1/3246* (2019.01)
*G06N 20/00* (2019.01)

(52) U.S. Cl.
CPC ........... *G06F 1/3246* (2013.01); *G06N 20/00* (2019.01)

(58) Field of Classification Search
CPC .............................. G06F 1/3246; G06N 20/00
See application file for complete search history.

(56) References Cited

U.S. PATENT DOCUMENTS 7,644,051 B1 * 1/2010 Moore ................ G05B 13/048 706/903
9,092,865 B2 * 7/2015 Chudy ...................... G06T 7/74
2010/0211810 A1 * 8/2010 Zacho ................... G06F 1/3203 713/320
2015/0227397 A1 * 8/2015 Gogula ................. G06F 9/5094 718/104
2016/0107312 A1 * 4/2016 Morrill .................. G11B 17/22 700/214
2017/0255239 A1 * 9/2017 Matteson .............. G06F 1/3209
2018/0024578 A1 * 1/2018 Ahuja ..................... G06F 1/206 700/300
2018/0204116 A1 * 7/2018 Evans .................... G06N 3/045
2021/0042140 A1 * 2/2021 Paul ...................... G06F 1/3206
2021/0064388 A1 * 3/2021 Gardner .................... G06N 3/09
2021/0103458 A1 * 4/2021 Manousakis ........ G06F 9/45558
2021/0295151 A1 * 9/2021 Yoo ...................... G06V 10/764
2021/0405727 A1 * 12/2021 Singh ...................... G06F 1/329
2022/0214917 A1 * 7/2022 Chien ................. G06F 9/45558
2023/0018342 A1 * 1/2023 Lecuivre ............... G06F 9/4893
2023/0065444 A1 * 3/2023 Pyla ...................... G06F 9/5022
(Continued)

FOREIGN PATENT DOCUMENTS

KR 20160092721 A * 8/2016 ............... G06F 1/28

*Primary Examiner* — Faisal M Zaman
(74) *Attorney, Agent, or Firm* — Beyer Law Group LLP

(57) ABSTRACT

A data center has a management system for selecting a server computer to start or shut down. The management system has a machine learning model that is trained to predict power consumption of the data center using a large training dataset of many, different data centers. The machine learning model is fine-tuned using data of server computers of the data center. Input data that include temperature information of a server computer and position of the server computer are input to the machine learning model to obtain a predicted difference in power consumption of the data center. Predicted differences in power consumption of the data center are compared to select a server computer to start or shut down.

10 Claims, 9 Drawing Sheets

(56) References Cited

U.S. PATENT DOCUMENTS

| | | | | |
|---|---|---|---|---|
| 2023/0145373 | A1* | 5/2023 | Yokoyama | G06F 1/3215 713/300 |
| 2023/0229216 | A1* | 7/2023 | Lerer | G06F 1/28 713/300 |
| 2023/0308261 | A1* | 9/2023 | Campbell | G06F 21/44 |
| 2023/0376400 | A1* | 11/2023 | Backhus | G06N 20/00 |
| 2023/0409393 | A1* | 12/2023 | Misra | G06F 11/3409 |
| 2023/0418687 | A1* | 12/2023 | Tantawi | G06F 9/5094 |
| 2024/0020157 | A1* | 1/2024 | Gill | G06F 9/5027 |
| 2024/0112010 | A1* | 4/2024 | Jain | G06N 5/01 |
| 2024/0126360 | A1* | 4/2024 | Mukherjee | G06F 1/3296 |
| 2024/0249045 | A1* | 7/2024 | Jia | G06F 11/3447 |
| 2024/0330047 | A1* | 10/2024 | Lee | G06F 9/5005 |
| 2025/0005214 | A1* | 1/2025 | Ganju | G06F 30/13 |
| 2025/0028621 | A1* | 1/2025 | Nyamwange | G06F 11/3476 |
| 2025/0106276 | A1* | 3/2025 | de Souza | G06N 20/00 |
| 2025/0131324 | A1* | 4/2025 | Sethi | G06N 20/20 |
| 2025/0165052 | A1* | 5/2025 | Dangi | G06F 1/329 |
| 2025/0173745 | A1* | 5/2025 | Majdabadi | G06Q 30/0202 |
| 2025/0190785 | A1* | 6/2025 | Hicks | G06N 3/098 |
| 2025/0292309 | A1* | 9/2025 | Joshi | G06N 20/00 |
| 2025/0293542 | A1* | 9/2025 | Reynolds | H02J 13/12 |
| 2025/0335246 | A1* | 10/2025 | He | G06F 9/5088 |
| 2025/0356252 | A1* | 11/2025 | Park | G06N 20/00 |
| 2025/0377709 | A1* | 12/2025 | Fang | G06F 1/3246 |

* cited by examiner

MANAGEMENT SYSTEM FOR PROVISIONING SERVER RESOURCES OF A DATA CENTER

TECHNICAL FIELD

The present disclosure is generally directed to data center management systems, and more particularly to conserving power in data centers.

BACKGROUND

A server computer, which is simply referred to herein as "server", comprises computer hardware that provides services to other computers on a computer network. A server may host a database, serve files, host emails, process data, and/or provide other computing service. Needless to say, servers are the backbone of information technology (IT) infrastructure of an enterprise.

A data center is a facility that houses servers and associated components, such as telecommunications and storage systems. A plurality of servers, such as blade servers, may be installed in a same server chassis. A data center typically includes a plurality of racks, with each rack containing a plurality of server chassis.

Servers may be powered ON and provided to users upon request for a server resource. In response to a request for a server resource, a server is started by powering ON the server and provisioning an operating system to the server. A server may be powered OFF when not in use. A server may be powered ON or OFF automatically (i.e., by program control) by way of the server's Baseboard Management Controller (BMC) or other power controller. The operating system of the server may also be provisioned automatically by Pre-Boot Execution Environment (PXE) or Internet Pre-Boot Execution Environment (iPXE).

Servers and other resources of a data center may be managed using a data center management system. When a user makes a request for server resources, the management system may employ common methods, such as best-fit, worst-fit, or round-robin, to select a server among a plurality of servers that meets the requirements of the request, and thereafter start the selected server. The popularity of artificial intelligence (AI) has also led to the use of Large Language Models (LLMs) to assist in managing data centers. However, these conventional data center management methodologies do not adequately address the effect of specific servers in the power consumption of data centers.

BRIEF SUMMARY

In one embodiment, a method of providing a server resource in a data center includes training a machine learning model to predict power consumption of the data center using an initial training dataset comprising temperature information, server positions, and power consumption information of server computers of different data centers. The machine learning model is thereafter fine-tuned using fine-tuning data comprising temperature information, server positions, and power consumption information of a plurality of server computers of the data center. After the machine learning model is fine-tuned, prediction requests are sent to the machine learning model, each of the prediction requests including temperature information of a server computer of the plurality of server computers that is powered OFF and a position of the server computer in the data center. For each of the prediction requests, the machine learning model is used to generate a predicted difference in power consumption of the data center. Predicted differences in power consumption of the data center are compared to identify a selected server computer among the plurality of server computers that is powered OFF but when powered ON will result in a lowest power consumption of the data center relative to powering ON other server computers of the plurality of server computers. The selected server computer is started by powering ON the selected server computer.

In another embodiment, a method of shutting down a server computer in a data center includes, training a machine learning model to predict power consumption of the data center using an initial training dataset comprising temperature information, server positions, and power consumption information of server computers of different data centers. The machine learning model is thereafter fine-tuned using fining tuning data comprising temperature information, server positions, and power consumption information of a plurality of server computers of the data center. After the machine learning model is fine-tuned, prediction requests are sent to the machine learning model, each of the prediction requests including temperature information of a server computer of the plurality of server computers that is powered ON and a position of the server computer in the data center. For each of the prediction requests, the machine learning model is used to generate a predicted difference in power consumption of the data center. Predicted differences in power consumption of the data center are compared to identify a selected server computer among the plurality of server computers that is powered ON but when powered OFF will result in a lowest power consumption of the data center relative to powering OFF other server computers of the plurality of server computers.

In yet another embodiment, a computer system comprises at least one processor and a memory, the memory storing instructions that when executed by the at least one processor cause the computer system to: train a machine learning model to predict power consumption of the data center using an initial training dataset comprising temperature information, server positions, and power consumption information of server computers of different data centers; the machine learning model is thereafter fine-tuned using fine-tuning data comprising temperature information, server positions, and power consumption information of a plurality of server computers of the data center; after the machine learning model is fine-tuned, send prediction requests to the machine learning model, each of the prediction requests including temperature information of a server computer of the plurality of server computers that is powered OFF and a position of the server computer in the data center; for each of the prediction requests, used the machine learning model to generate a predicted difference in power consumption of the data center; compare predicted differences in power consumption of the data center to identify a selected server computer among the plurality of server computers that is powered OFF but when powered ON will result in a lowest power consumption of the data center relative to powering ON other server computers of the plurality of server computers; and start the selected server computer by powering ON the selected server computer.

These and other features of the present disclosure will be readily apparent to persons of ordinary skill in the art upon reading the entirety of this disclosure, which includes the accompanying drawings and claims.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

DETAILED DESCRIPTION

In the present disclosure, numerous specific details are provided, such as examples of systems, components, and methods, to provide a thorough understanding of embodiments of the invention. Persons of ordinary skill in the art will recognize, however, that the invention can be practiced without one or more of the specific details. In other instances, well-known details are not shown or described to avoid obscuring aspects of the invention.

Figure 1:
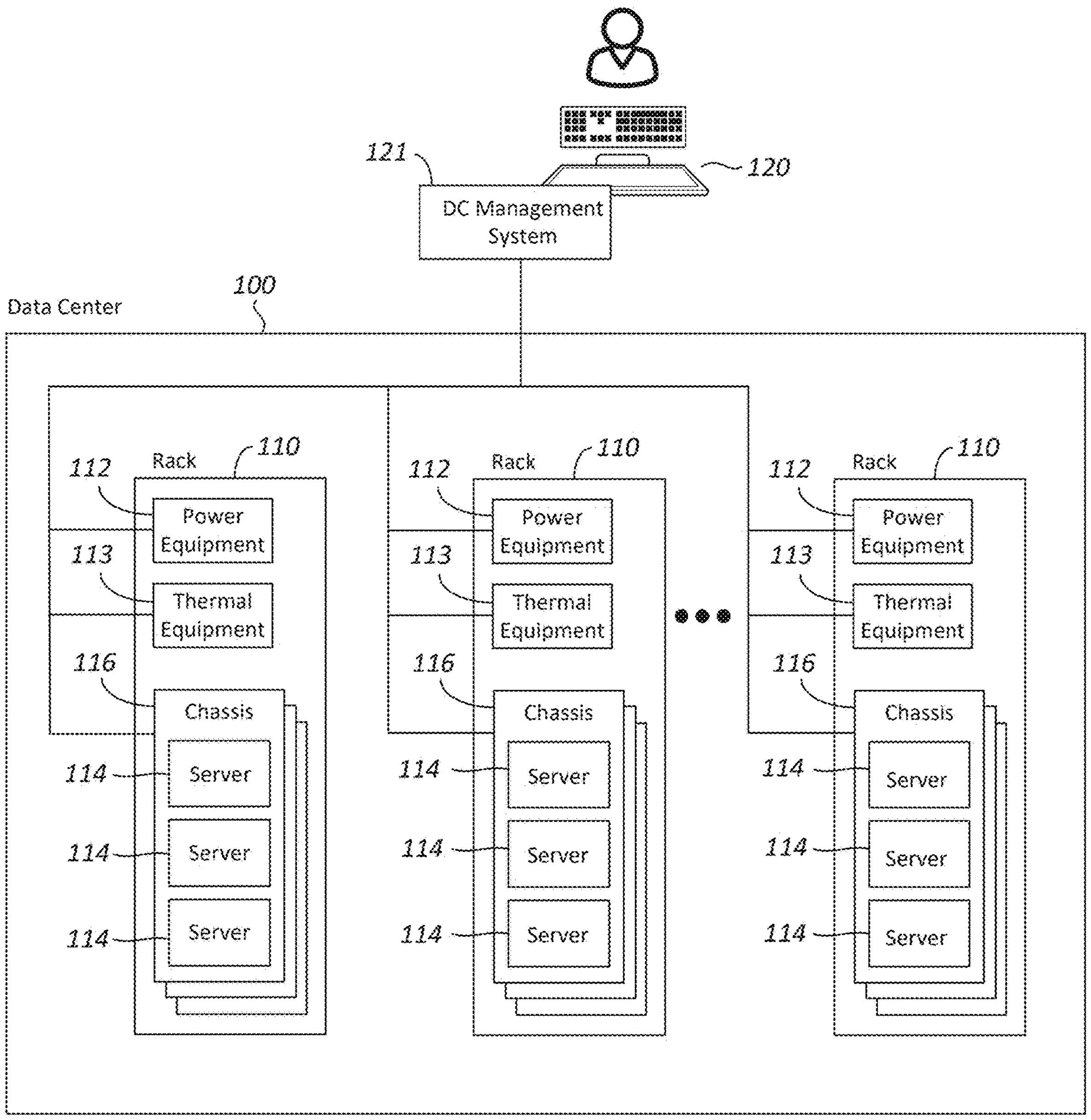
FIG. 1 shows a block diagram of a data center, in accordance with an embodiment of the present invention.

FIG. 1 shows a block diagram of a data center 100, in accordance with an embodiment of the present invention. The data center 100 may be that of a private business, government, educational institution, or other organization. The data center 100 includes, among many resources, a plurality of server computers ("servers") 114. A server 114 is a hardware component comprising one or more boards (e.g., motherboard, daughter board) or other substrate that supports at least one processor, memory, Baseboard Management Controller (BMC), and other electrical circuits. Software executed by a server 114 is also referred to as "server software".

A plurality of servers 114 may be installed in a server chassis 116, which may be mounted in a rack 110. A plurality of server chassis 116 may be mounted in a rack 110. The data center 100 includes a plurality of racks 110, with each rack 110 containing a plurality of servers 114 and other equipment. Each server 114 has a designated server identifier (ID) and a server location in the data center 100. The server location may indicate a rack 110 (e.g., by rack ID), the location of the rack 110 in the data center (e.g., by room number, zone, coordinate, etc.), and a position of the server 114 in the rack 110 (e.g., by rack unit). The servers 114 and other computers of the data center 100 communicate over a computer network (not shown) of the data center 100. Network components, such as routers, switches, gateways etc., are not shown for clarity of illustration.

A rack 110 may include power equipment 112 comprising power distribution units (PDUs), power monitoring equipment, backup power systems (e.g., uninterruptable power supply (UPS)), etc. Generally, the power equipment 112 provide stable power and monitor power loads in the rack 110 to ensure normal operation of the servers 114 and other hardware resources in the rack 110.

A rack 110 may further include thermal equipment 113 for controlling and regulating the temperature inside the rack 110 to ensure that equipment inside the rack 110 operate within the appropriate temperature range. The thermal equipment 113 may include, for example, air conditioning systems, cooling equipment, heat dissipation fans, etc.

Each rack 110 is designed to have thermal convection to ensure effective air circulation and heat dissipation. A rack 110 may include air inlets and outlets to ensure that cooling air can flow through equipment in the rack 110 and exhaust hot air. Thermal sensors may be installed at the outlet of the rack 110 to monitor the temperature inside the rack 110. Additionally, within a rack 110, each server 114 may have its own thermal sensor to monitor the temperature inside the chassis of the server 114. These thermal sensors may be placed on main components of the server 114, such as on the processor, hard drive, and/or chassis 116 of the server 114.

The data center 100 includes a data center (DC) management system 121 that runs on a computer system 120. The computer system 120 may be employed by an administrator to manage the resources of the data center 100. In one embodiment, the management system 121 is implemented in software. The computer system 120 comprises at least one processor and a memory, the memory storing instructions of the management system 121 that when executed by the at least one processor cause the computer system 120 to operate as described herein. As will be more apparent below, the management system 121 is configured to receive, among other information, monitoring data that the management system 121 processes to select a server 114 to start or shut down.

In one embodiment, the monitoring data received by the management system 121 include temperature information of a server 114, power status of the server 114, and power consumption of a rack 110 containing the server 114 at a time instance when the monitoring data are captured. The management system 121 may receive temperature information of the server 114, power status of the server 114, and power consumption of the rack 110 from associated monitoring equipment upon request or periodically.

The temperature information of a server 114 may include the temperature of the server 114 and the temperature in the rack 110 containing the server 114. Temperature information may be received by the management system 121 from thermal sensors of the racks 110 and/or temperature sensors in the chassis or components of the servers 114. The power status of the servers 114 may be received from the corresponding BMCs of the servers 114. The power consumption of a rack 110 may be received from a power equipment 112 of the rack 110. Power consumption may be in units of electrical current (in amps) or power (in watts).

In one embodiment, the power consumption of the data center 100 is the total of power consumptions of the racks 110 containing the servers 114, which are managed by the management system 121. The servers 114 are managed by the management system 121 in that the servers 114 are registered to be controlled and/or monitored by the management system 121. As can be appreciated, a rack 110 may have other equipment besides servers 114. However, the power consumption of a rack 110 will change as a server 114 in the rack 110 is powered ON or OFF, providing an indication of the effect of the server 114 on the power consumption of the rack 110. The power consumption of the rack 110 may thus be used as power consumption information of the server 114.

Figure 2:
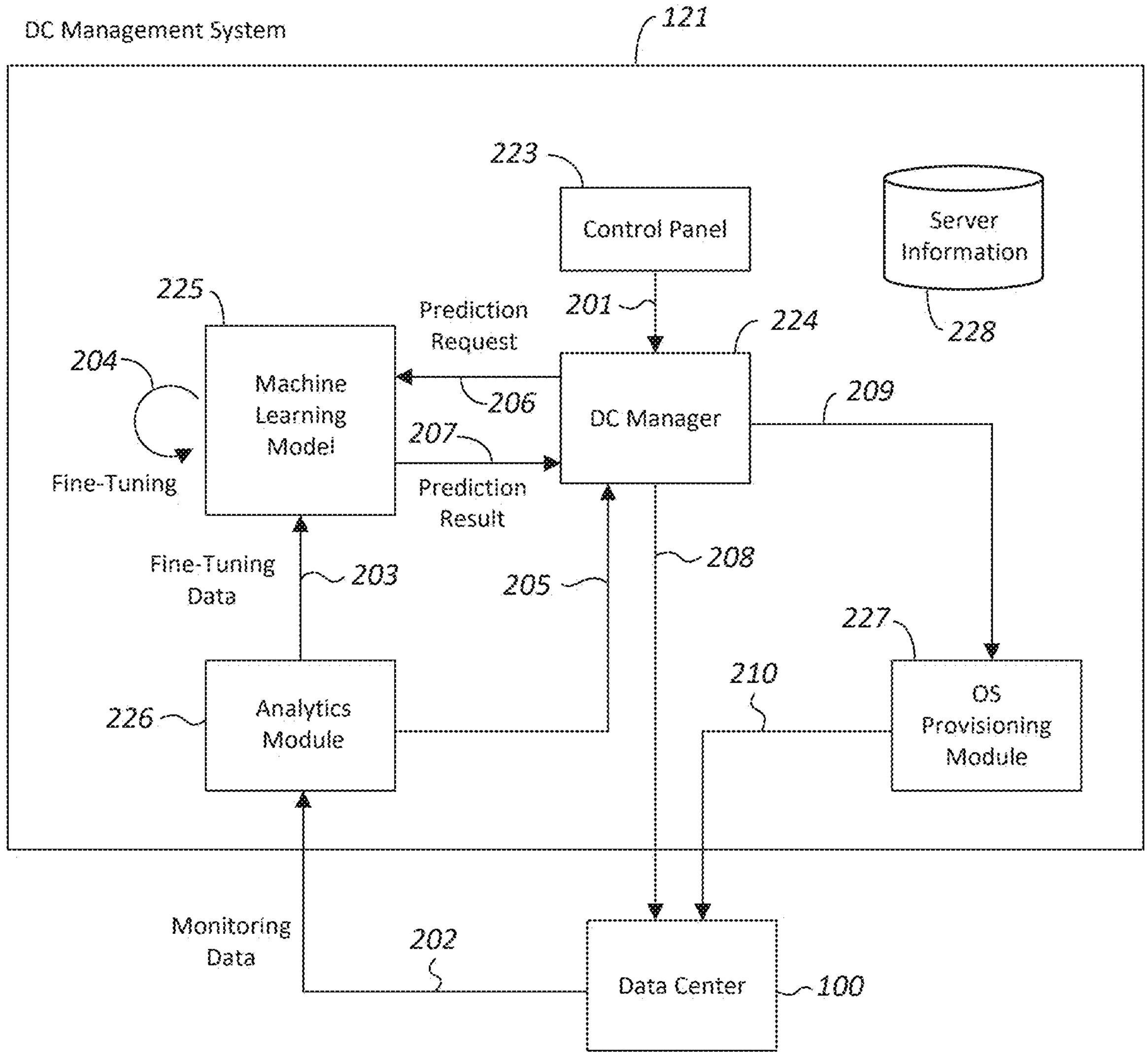
FIG. 2 shows a block diagram of a data center management system, in accordance with an embodiment of the present invention.

FIG. 2 shows a block diagram of the management system 121, in accordance with an embodiment of the present invention. The management system 121 may comprise one or more software modules including a control panel 223, a data center manager 224, a machine learning model 225, an analytics module 226, and an operating system (OS) provisioning module 227. The management system 121 may further include or have access to a server information datastore 228, which stores, by server ID, server information of the servers 114. Server information of each server 114 may include the brand of the server 114, the model of the server 114, the location of the rack 110 (in the data center 100) containing the server 114, and the position of the server 114 in the rack 110. The server information of a server 114 may be entered in the management system 121 when the server 114 is registered to be managed by the management system 121.

The control panel 223 provides a graphical user interface of the management system 121 (see arrow 201). For example, the administrator or other user may employ the control panel 223 to power ON or power OFF a server 114.

The data center manager 224 coordinates the operations of the various modules of the management system 121. In the example of FIG. 2, the data center manager 224 may receive requests for server resources from the control panel 223, over the computer network, or by way of other communication channel. Responsive to a request for a server resource, the data center manager 224 starts a server 114 by selecting a server 114 among the plurality of servers 114, powering ON the selected server 114, provisioning an operating system to the selected server 114, and performing other actions in accordance with the request for a server resource. The data center manager 224 selects a server 114 based on the requirements of the request for a server resource, such as operating system and computing specifications. Advantageously, the data center manager 224 also selects the server 114 based on the impact of the server 114 to the power consumption of the data center 100.

Deployment of a server within a data center is often influenced by environmental considerations, such as the position of air conditioning, relative positions of racks, and power consumption rates of different brands and models of a brand. These environmental considerations affect temperature variations at various locations within a data center, with temperature and power consumption typically exhibiting a positive correlation. That is, higher temperatures lead to higher power consumption, whereas lower temperatures tend to save power. However, these environmental considerations influencing temperature are highly complex, making it difficult to derive power consumption generated by each server using specific algorithms or formulas.

The machine learning model 225 undergoes an initial training stage and a fine-tuning stage. In the initial training stage, the machine learning model 225 is trained with a large initial training dataset 352 (shown in FIG. 3) comprising selection factors of many, different data centers. In one embodiment, server selection factors include, at a time instance, the temperature of a server, the temperature in a rack containing the server, the power consumption of the rack containing the server, the brand of the server, the model of the server, the location of the rack containing the server, the position of the server in the rack, and the action for the server (e.g., whether the server is started or shut down). The initial training stage allows the machine learning model 225 to learn from a relatively large dataset to be able to predict the effect of powering ON or powering OFF a server 114 to the power consumption of the data center 100.

The initial training dataset 352 used to train the machine learning model 225 may be too general to allow the machine learning model 225 to make accurate predictions given the particulars of the data center 100. To address this concern, after the initial training stage, the machine learning model 225 is continuously fine-tuned using fine-tuning data comprising selection factors of the servers 114 of the data center 100 during operation.

The analytics module 226 receives monitoring data from the data center 100 (see arrow 202). The analytics module 226 forms fine-tuning data, which comprise the monitoring data and server information of the associated server 114. More particularly, in one embodiment, the fine-tuning data include, at a time instance, the temperature of a server 114, the temperature in a rack 110 containing the server 114, the power consumption of the rack 110 containing the server 114, the brand of the server 114, the model of the server 114, the location of the rack 110 containing the server 114, the position of the server 114 in the rack 110, and the action for the server 114. The fine-tuning data are input to the machine learning model 225 (see arrow 203) to obtain learned features. Learned features are numerical representations of data in a lower-dimensional space that preserve relevant patterns. A regressor in the output layer of the machine learning model 225 converts the learned features into a meaningful number, which indicates the predicted (anticipated) difference in power consumption of the data center that results from changing the power status of the server 114. The predicted difference in power consumption may be compared to a corresponding actual difference in power consumption to fine-tune the machine learning model 225 (see arrow 204).

During the application stage of the machine learning model 225, the data center manager 224 may send a prediction request to the machine learning model 225 (see arrow 206). The prediction request includes input data comprising monitoring data from the analytics module 226 and server information of the associated server 114. More particularly, in one embodiment, the input data comprise the temperature of a server 114, the temperature in a rack 110 containing the server 114, the power consumption of the rack 110 containing the server 114, the brand of the server 114, the model of the server 114, the location of the rack 110 containing the server 114, the position of the server 114 in the rack 110, and the action for the server 114. Responsive to the input data, the machine learning model 225 internally outputs learned features.

The machine learning model 225 determines, for the learned features, a predicted difference between a predicted power consumption of the data center 100 and a current actual power consumption of the data center 100 for the same associated server 114. More particularly, a regressor in the output layer of the machine learning model converts lower-dimensional learned features into meaningful high-dimensional information. This information represents the predicted difference in power consumption of data center 100 that will result from starting or shutting down a server 114. The predicted difference may be included in the prediction result provided to the data center manager 224 (see arrow 207).

The data center manager 224 sends a plurality of prediction requests to the machine learning model 225 and receives a prediction result for each prediction request. In response to an inquiry or request for server resource received from the control panel 223 or other communication channel, the data center manager 224 selects a server 114 to start or identifies a server 114 to shut down based on predicted differences included in the prediction results. The data center manager 224 may start or shut down a selected server 114 by sending a signal to the data center 100 to power ON or power OFF the server 114 (see arrow 208). A signal to power ON or power OFF a server 114 may be directly received by the server 114 (e.g., by the BMC of the server 114) or by another component of the data center 100, which in turn powers the server 114 ON or OFF.

The data center manager 224 sends a signal to the OS provisioning module 227 to provision an operating system to a server 114 that is being started (see arrow 209). In response to receiving the signal from the data center manager 224, the OS provisioning module 227 provisions an operating system to the server 114 (see arrow 210; e.g., by PXE or iPXE).

Figure 3:
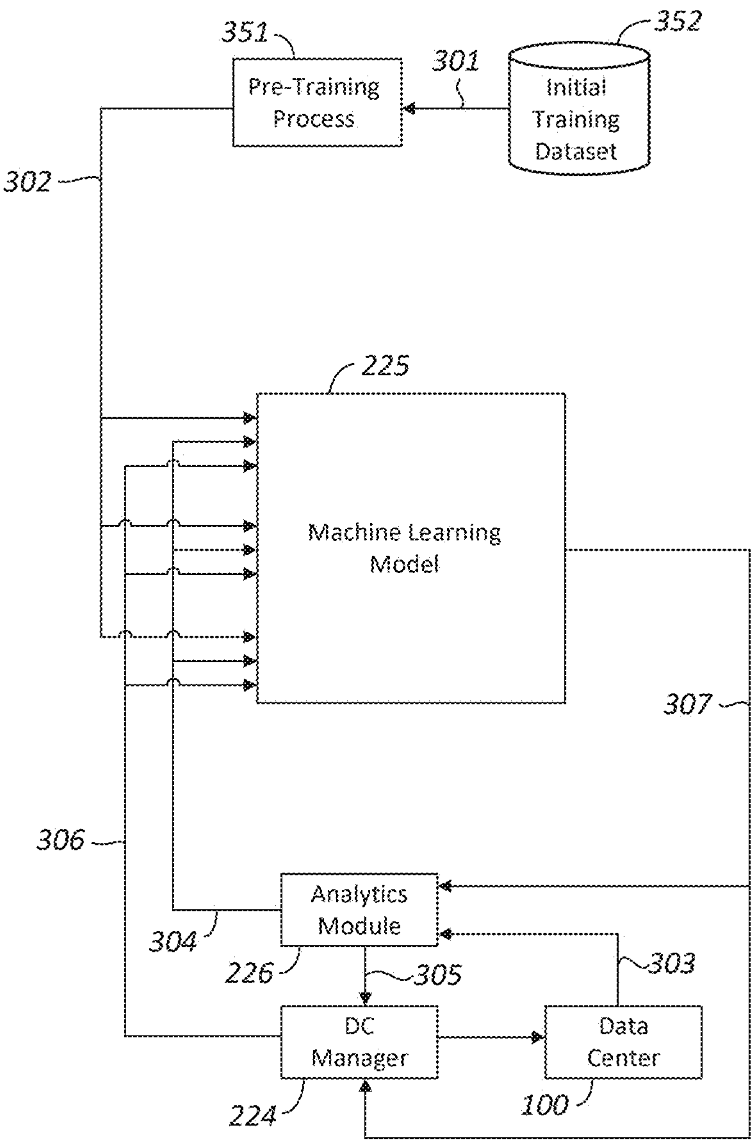
FIG. 3 illustrates operation of a machine learning model, in accordance with an embodiment of the present invention.

FIG. 3 illustrates operation of the machine learning model 225, in accordance with an embodiment of the present invention. The machine learning model 225 is configured to receive the initial training dataset 352 for the initial training of the machine learning model 225, fine-tuning data from the analytics module 226 for the fine-tuning of the machine learning model 225, and input data from the data center manager 224 for the application stage of the machine learning model 225. The machine learning model 225 receives these data in a predefined format, such as vectors with selection factors as elements. Data are encoded to the expected format of the machine learning model 225 before being provided to the machine learning model 225. The encoding may be performed by a component of the machine learning model 225 or other module that sends the data to the machine learning model 225.

In the example of FIG. 3, during the initial training stage, the machine learning model 225 is trained with the initial training dataset 352, which is relatively large and from many, different data centers. A pre-training process 351 includes fetching the initial training dataset 352 (see arrow 301), encoding the initial training dataset 352 to the format of the machine learning model 225, and training the machine learning model 225 using the encoded initial training dataset 352 to predict the power consumption of the data center 100 (see arrow 302). The prediction of the power consumption of the data center 100 can be compared with the actual power consumption of the data center 100 in the initial training dataset 352, thereby increasing the accuracy of the machine learning model 225.

The analytics module 226 fetches monitoring data from the data center 100 (see arrow 303), encodes the monitoring data into fine-tuning data that include the monitoring data and server information of the associated server 114, and provides the fine-tuning data to the machine learning model 225 (see arrow 304) for fine-tuning of the machine learning model 225. The fine-tuning may be performed by, for example, the analytics module 226, data center manager 224, or other module of the management system 121.

The data center manager 224 receives monitoring data from the analytics module 226 (see arrow 305). The data center manager 224 generates input data that include the monitoring data and the server information of the associated server 114. The data center manager 224 provides the input data to the machine learning model 225 as part of a prediction request (see arrow 306).

The machine learning model 225 receives the input data from the data center manager 224 and generates a prediction result that is responsive to the input data. The prediction result includes a predicted difference between the predicted power consumption of the data center 100 and the current actual power consumption of the data center 100 for the associated server 114. The prediction result is received by the data center manager 224 (see arrow 307). The data center manager 224 selects a server 114 among the plurality of servers 114 based on the predicted differences in power consumption of the data center 100.

Figure 4:
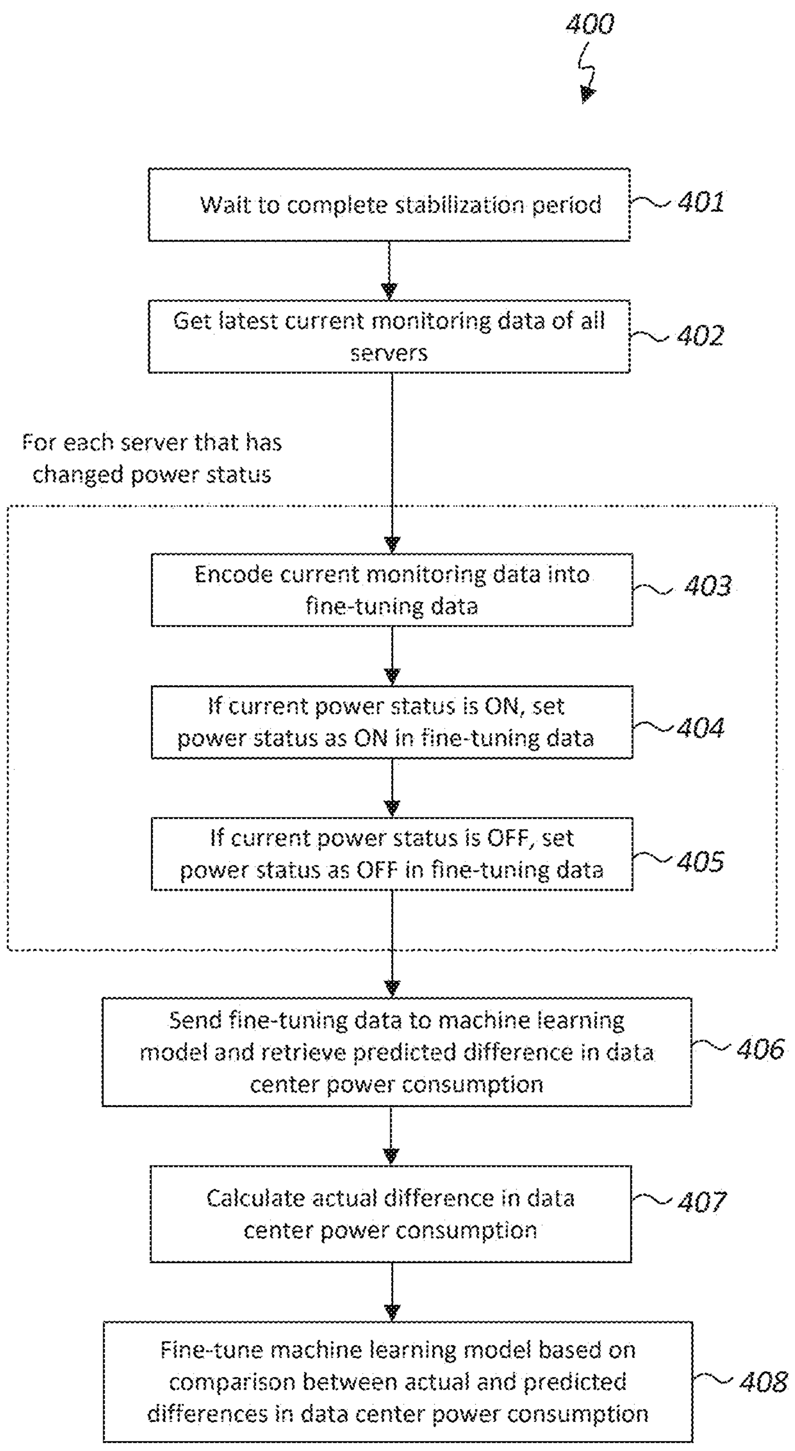
FIG. 4 shows a flow diagram of a method of fine-tuning a machine learning model, in accordance with an embodiment of the present invention.

FIG. 4 shows a flow diagram of a method 400 of fine-tuning the machine learning model 225, in accordance with an embodiment of the present invention. The method 400 may be performed by one or more modules of the management system 121.

In step 401, the management system 121 waits for completion of a stabilization period before proceeding. Generally, when a server 114 is first powered ON, the server 114 experiences a burst of time during which the server 114 consumes a significant amount of power. The stabilization period allows for the power consumption of the servers 114 to stabilize before proceeding with the fine-tuning.

In step 402, the management system 121 collects the current (i.e., latest) monitoring data of the servers 114 that are managed by the management system 121.

Steps 403-405 are performed by the management system 121 for each server 114 that has changed power status.

In step 403, the current monitoring data of the server 114 are encoded into fine-tuning data. The fine-tuning data include the current monitoring data and the server information of the server 114.

In step 404, if the current power status of the server 114 is ON, the power status of the server 114 in the fine-tuning data is set to ON. Similarly, in step 405, if the current power status of the server 114 is OFF, the power status of the server 114 in the fine-tuning data is set to OFF. Steps 404 and 405 ensure that the fine-tuning data have the correct power status of the server 114.

In step 406, the analytics module 226 sends the fine-tuning data of each of the servers 114 that have changed power status to the machine learning model 225 and retrieves a predicted difference in the power consumption of the data center 100 from the machine learning model 225. The power consumption of the data center 100 is the sum of power consumption of all the racks 110 containing servers 114. The machine learning model 225 generates a predicted difference in power consumption of the data center 100 for each fine-tuning data.

In step 407, the management system 121 calculates the actual difference in the power consumption of the data center 100. The actual difference in power consumption may be calculated by subtracting a previous actual power consumption of the data center 100 from the current actual power consumption of the data center 100.

In step 408, the machine learning model 225 of the machine learning model 225 is fine-tuned based on a comparison of the actual difference with the predicted difference in power consumption of the data center 100. The machine learning model 225 may be fine-tuned to generate a beta machine learning model. The predictions of the beta machine learning model are compared to predictions of the machine learning model 225, and the machine learning model that more accurately predicts the power consumption behavior of the data center 100 is selected to be used as the next machine learning model.

Figure 5:
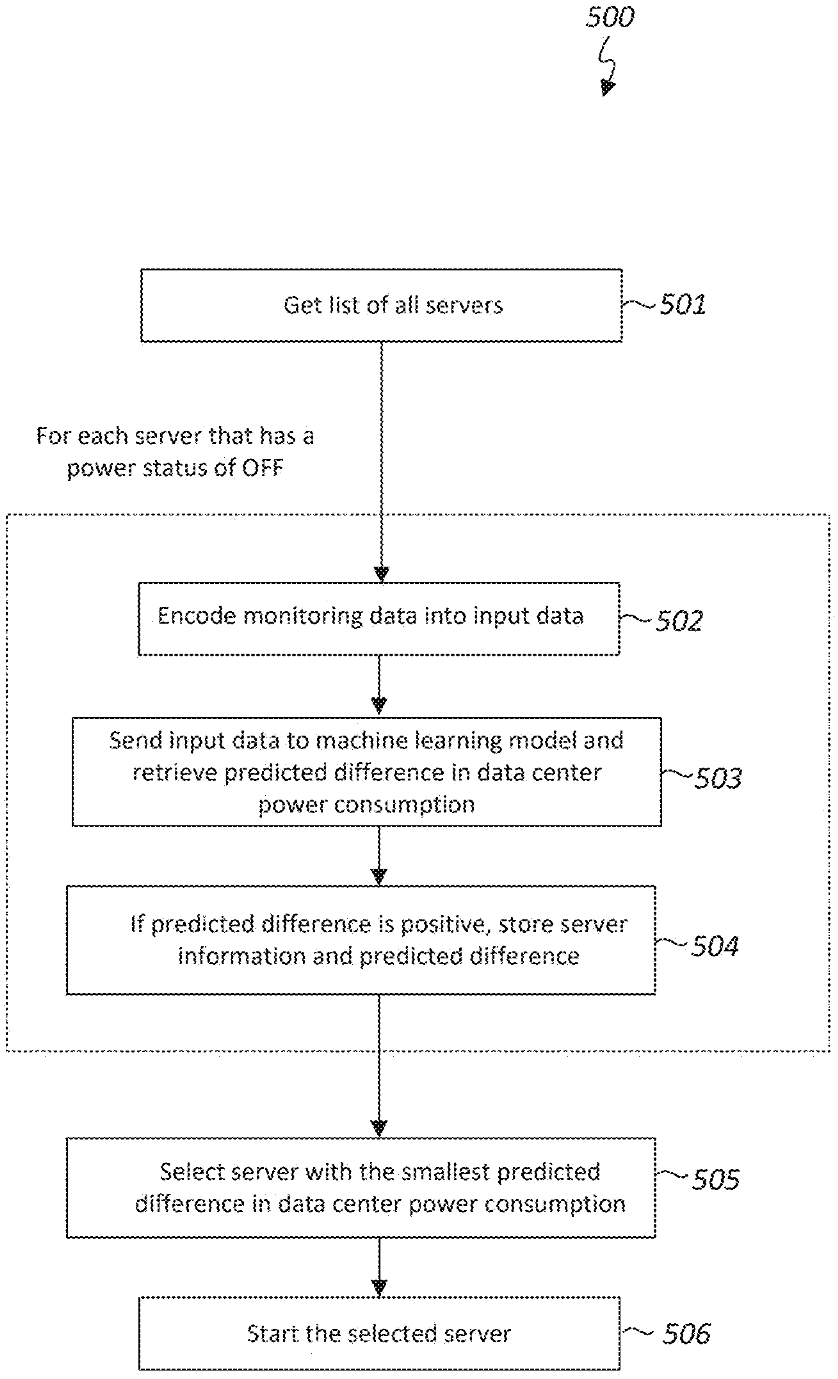
FIG. 5 shows a flow diagram of a method of selecting a server to start, in accordance with an embodiment of the present invention.

FIG. 5 shows a flow diagram of a method 500 of selecting a server 114 among the plurality of servers 114 to start, in accordance with an embodiment of the present invention.

The method 500 may be performed by one or more modules of the management system 121 in response to a request for a server resource.

In step 501, the management system 121 obtains a listing of all servers 114 that are managed by the management system 121. The listing of the servers 114 may be obtained from the server information database 228 (shown in FIG. 2), for example.

Steps 502-504 are performed by the management system 121 for each server 114 that has a power status of OFF. Additionally, these servers must also meet the conditions of the request for a server resource.

In step 502, the management system 121 encodes the current monitoring data of the server 114 into input data. The input data include the current monitoring data and the server information of the server 114.

In step 503, the management system 121 sends the input data to the machine learning model 225 and retrieves the resulting predicted difference in power consumption of the data center 100 from the machine learning model 225. The predicted difference in power consumption is calculated by subtracting a current actual power consumption of the data center 100 from a predicted power consumption of the data center 100 (i.e., the predicted power consumption minus the current actual power consumption).

In step 504, the management system 121 stores the server information of the associated server 114 and the predicted difference in power consumption when the predicted difference in power consumption is a positive number. The predicted difference in power consumption may be stored in a temporary array in memory, for example.

In step 505, in selecting a server 114 to start, the management system 121 identifies a server 114 with the smallest predicted difference in power consumption among the predicted differences in power consumption. For example, the management system 121 may search the temporary array to find a server 114 that when powered ON results in the smallest predicted difference in power consumption of the data center 100 compared to powering ON other servers 114.

In step 506, the management system 121 starts the selected server 114 by powering ON the selected server.

Figure 6:
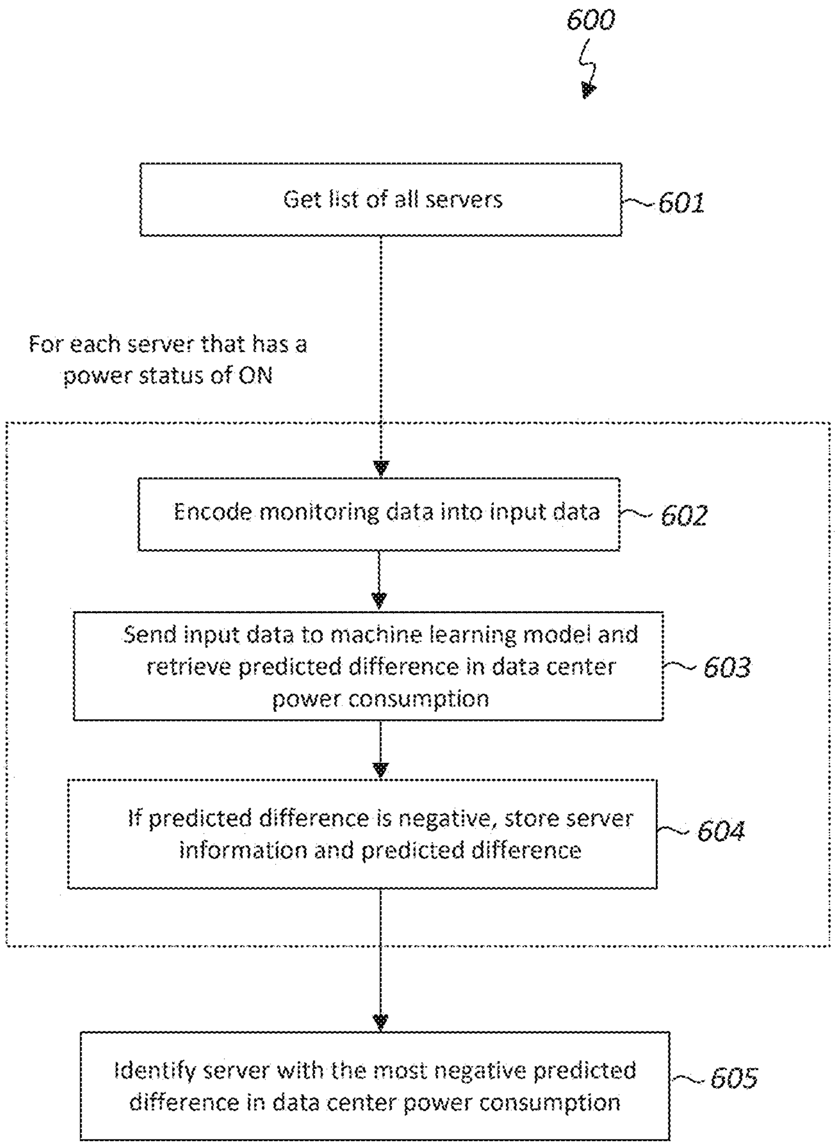
FIG. 6 shows a flow diagram of a method of identifying a server to shut down, in accordance with an embodiment of the present invention.

FIG. 6 shows a flow diagram of a method 600 of identifying a server to shut down, in accordance with an embodiment of the present invention. The method 600 may be performed by one or more modules of the management system 121.

In step 601, the management system 121 obtains a listing of all servers 114 that are managed by the management system 121.

Steps 602-604 are performed by the management system 121 for each server 114 that has a power status of ON. Additionally, these servers are identified by the user or administrator as ones that can be shut down without affecting service.

In step 602, the management system 121 encodes the current monitoring data of the server 114 into input data. The input data include the current monitoring data and the server information of the server 114.

In step 603, the management system 121 sends the input data to the machine learning model 225 and retrieves the resulting predicted difference in power consumption of the data center 100 from the machine learning model 225. The predicted difference in power consumption is calculated by subtracting a current actual power consumption of the data center 100 from a predicted power consumption of the data center 100 (i.e., the predicted power consumption minus the current actual power consumption).

In step 604, the management system 121 stores the server information of the associated server 114 and the predicted difference in power consumption when the predicted difference in power consumption is a negative number. The predicted difference in power consumption may be stored in a temporary array in memory, for example.

In step 605, the management system 121 identifies a server 114 with the most negative predicted difference in power consumption among the predicted differences in power consumption. For example, the management system 121 may search the temporary array to find a server 114 that when powered OFF results in the most negative predicted difference in power consumption compared to powering OFF other servers 114. The most negative predicted difference in power consumption indicates the largest power savings of the data center 100 when the selected server 114 is powered OFF relative to powering OFF other servers 114. The management system 121 may display power saving information of the selected server 114 on a display screen, to provide a user or administrator information on which server to shut down to save the most power.

Figure 7:
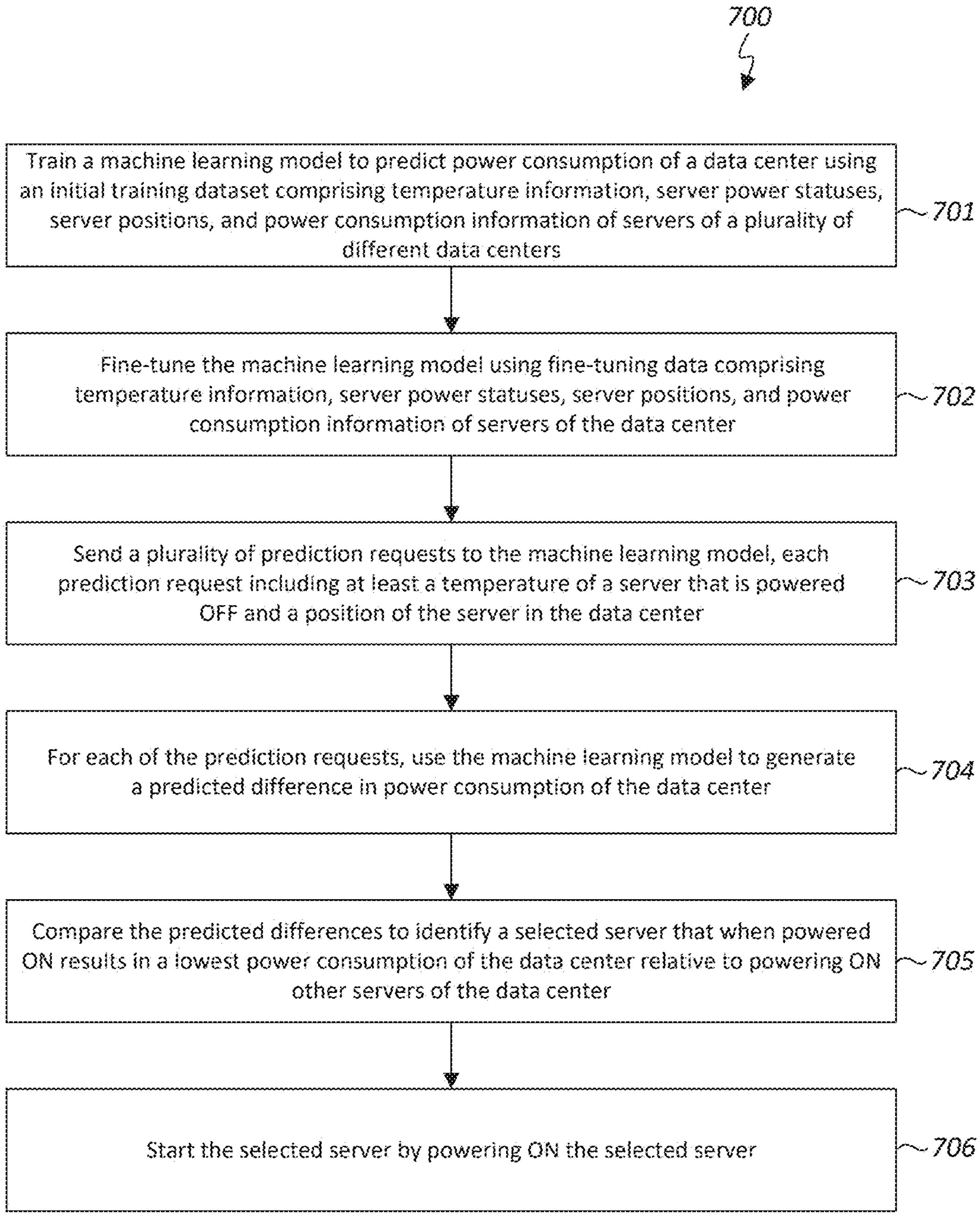
FIG. 7 shows a flow diagram of a method of providing a server resource in a data center, in accordance with an embodiment of the present invention.

FIG. 7 shows a flow diagram of a method 700 of providing a server resource in a data center, in accordance with an embodiment of the present invention. The method 700 may be performed using one or more modules of the management system 121.

In step 701, a machine learning model is trained to predict power consumption of a data center using an initial training dataset comprising temperature information, server power statuses, server positions, and power consumption information of servers of a plurality of different data centers.

In step 702, the machine learning model is fine-tuned using fine-tuning data comprising temperature information, server power statuses, server positions, and power consumption information of servers of the data center.

In step 703, a plurality of prediction requests is sent to the machine learning model, with each prediction request including at least the temperature of a server that is powered OFF and position of the server in the data center.

In step 704, for each of the prediction request, use the machine learning model to generate a predicted difference in power consumption of the data center.

In step 705, the predicted differences in power consumption of the data center are compared to identify a selected server that when powered ON results in a lowest power consumption of the data center relative to powering ON other servers of the data center.

In step 706, the selected server is started by powering ON the selected server. Starting the selected server may also include provisioning an operating system to the selected server.

Figure 8:
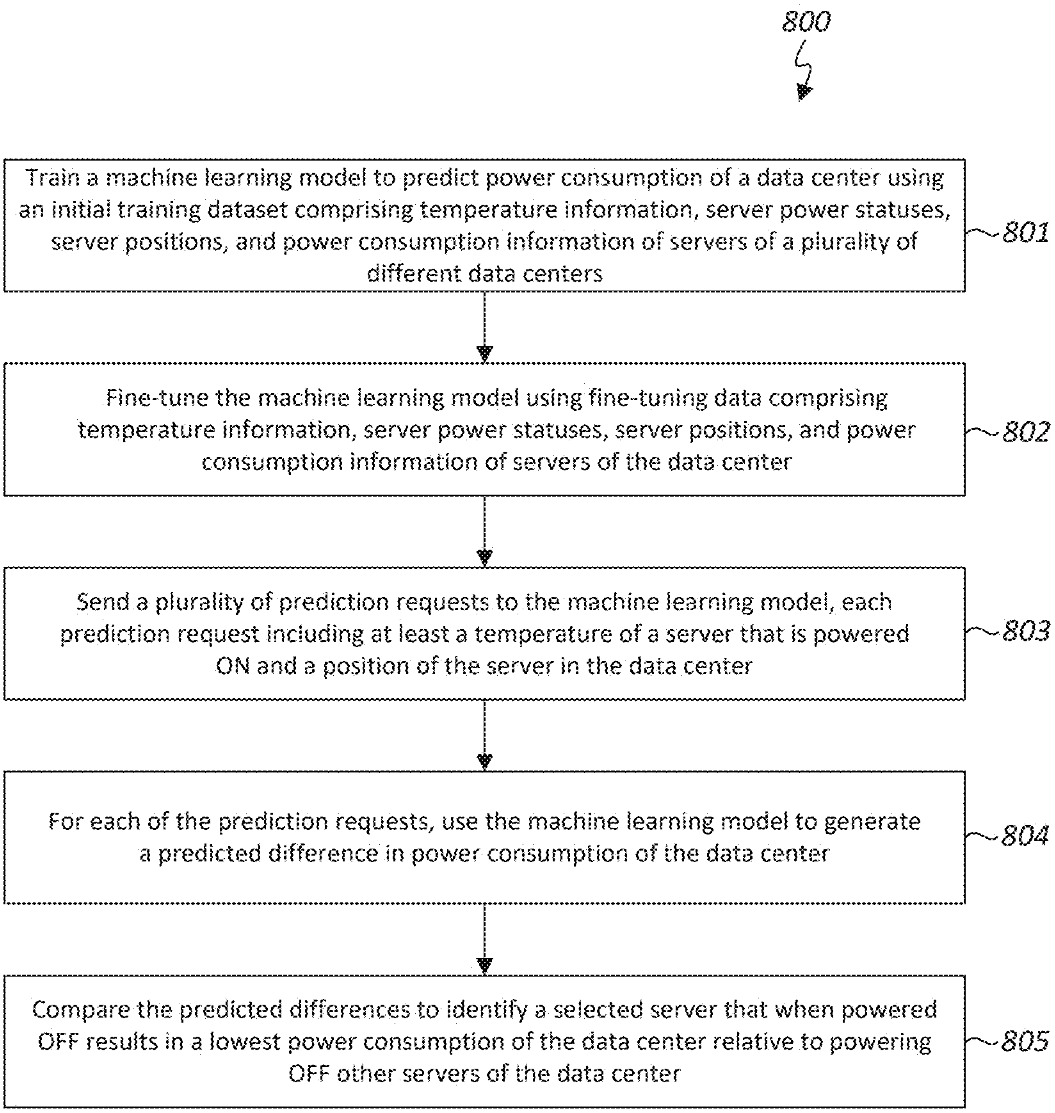
FIG. 8 shows a flow diagram of a method of identifying a server to shut down in a data center, in accordance with an embodiment of the present invention.

FIG. 8 shows a flow diagram of a method 800 of identifying a server to shut down, in accordance with an embodiment of the present invention. The method 800 may be performed using one or more modules of the management system 121.

In step 801, a machine learning model is trained to predict power consumption of a data center using an initial training dataset comprising temperature information, server power statuses, server positions, and power consumption information of servers of a plurality of different data centers.

In step 802, the machine learning model is fine-tuned using fine-tuning data comprising temperature information, server power statuses, server positions, and power consumption information of servers of the data center.

In step 803, a plurality of prediction requests is sent to the machine learning model, with each prediction request including at least a temperature of a server that is powered ON and position of the server in the data center.

In step 804, for each of prediction requests, use the machine learning model to generate a predicted difference in power consumption of the data center.

In step 805, the predicted differences in power consumption of the data center are compared to identify a selected server that when powered OFF results in a lowest power consumption of the data center relative to powering OFF other servers of the data center. Power saving information of the selected server may be displayed on a display screen, to provide a user or administrator information on which server to shut down to save the most power.

Figure 9:
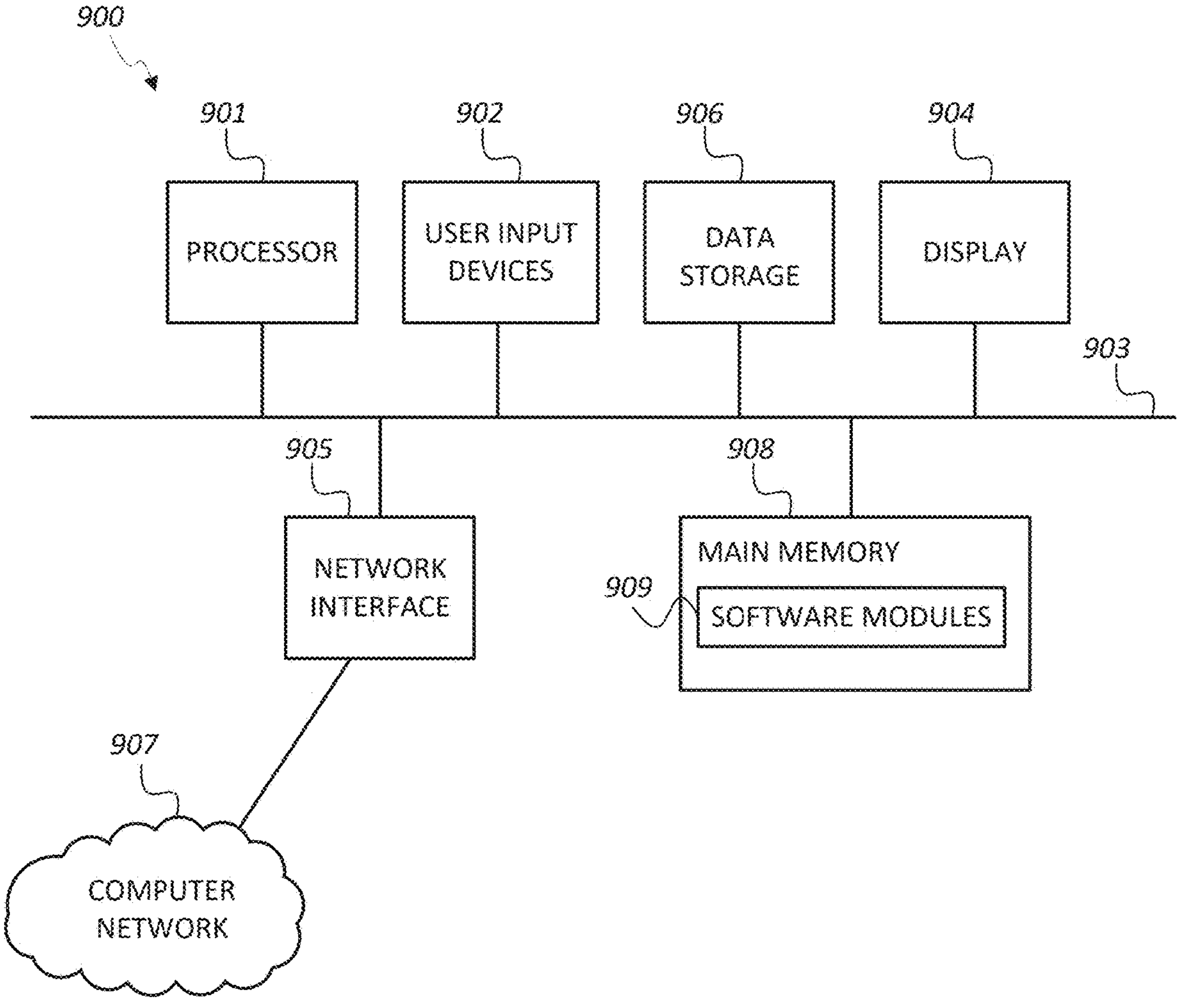
FIG. 9 shows a block diagram of a computer system 900 that may be employed with embodiments of the present invention.

FIG. 9 shows a block diagram of a computer system 900 that may be employed with embodiments of the present invention. The computer system 900 may be employed as a host computer of a data center management system or other computer described herein. The computer system 900 may have fewer or more components to meet the needs of a particular cybersecurity application. The computer system 900 may include one or more processors 901. The computer system 900 may have one or more buses 903 coupling its various components. The computer system 900 may include one or more user input devices 902 (e.g., keyboard, mouse), one or more data storage devices 906 (e.g., hard drive, optical disk, solid state drive), a display screen 904 (e.g., liquid crystal display, flat panel monitor), a computer network interface 905 (e.g., network adapter, modem), and a main memory 908 (e.g., random access memory). The computer network interface 905 may be coupled to a computer network 907, which in this example includes the Internet.

The computer system 900 is a particular machine as programmed with one or more software modules 909, comprising instructions stored non-transitory in the main memory 908 for execution by at least one processor 901 to cause the computer system 900 to perform corresponding programmed steps. An article of manufacture may be embodied as computer-readable storage medium including instructions that when executed by at least one processor 901 cause the computer system 900 to be operable to perform the functions of the one or more software modules 909. In one embodiment, the software modules 909 comprise a data center management system.

While specific embodiments of the present invention have been provided, it is to be understood that these embodiments are for illustration purposes and not limiting. Many additional embodiments will be apparent to persons of ordinary skill in the art reading this disclosure.

What is claimed is:

1. A method of providing a server resource in a data center, the method comprising:

training a machine learning model using an initial training dataset comprising temperature information, server positions, and power consumption information of server computers of different data centers;

fine-tuning the machine learning model using fine-tuning data comprising temperature information, server positions, and power consumption information of a plurality of server computers of the data center;

after the machine-learning model has been fine-tuned, sending prediction requests to the machine learning model for server computers of a subset of the plurality of server computers that are powered OFF, each of the prediction requests including at least a position in the data center of a respective server computer that is powered OFF;

for each of the prediction requests, using the machine learning model to generate a predicted difference in power consumption of the data center;

comparing predicted differences in power consumption of the data center to identify a selected server computer among the subset of the plurality of server computers that are powered OFF but when powered ON will result in a lowest power consumption of the data center relative to powering ON other server computers of the subset; and starting the selected server computer by powering ON the selected server computer responsive to receiving a request for a server resource.

2. The method of claim 1, wherein starting the selected server computer includes:

provisioning an operating system to the selected server computer.

3. The method of claim 1, wherein starting the selected server computer includes sending a signal to a Baseboard Management Controller (BMC) of the selected server computer.

4. The method of claim 1, wherein the power consumption information of the plurality of server computers includes power consumption of corresponding racks that contain the plurality of server computers.

5. The method of claim 1, wherein the predicted differences in power consumption of the data center are received from a regressor of the machine learning model.

6. A computer system comprising at least one processor and a memory, the memory storing instructions that when executed by the at least one processor cause the computer system to:

train a machine learning model to predict power consumption of a data center using an initial training dataset comprising temperature information, server positions, and power consumption information of server computers of a plurality of different data centers;

fine-tune the machine learning model using fine-tuning data comprising temperature information, server positions, and power consumption information of a plurality of server computers of the data center;

after the machine learning model is fine-tuned, send prediction requests to the machine learning model for server computers of a subset of the plurality of server computers that are powered OFF, each of the prediction requests including at least a position in the data center of a respective server computer that is powered OFF;

for each of the prediction requests, use the machine learning model to generate a predicted difference in power consumption of the data center;

compare predicted differences in power consumption of the data center to identify a selected server computer among the subset of the plurality of server computers that s are powered OFF but when powered ON will result in a lowest power consumption of the data center relative to powering ON other server computers of the subset; and start the selected server computer by powering ON the selected server computer responsive to receiving a request for a server resource.

7. The computer system of claim 6, wherein the instructions stored in the memory of the computer system, when executed by the at least one processor of the computer system cause the computer system to start the selected server computer by provisioning an operating system to the selected server computer.

8. The computer system of claim 6, wherein the instructions stored in the memory of the computer system, when executed by the at least one processor of the computer system cause the computer system to start the selected server computer by sending a signal to a Baseboard Management Controller (BMC) of the selected server computer.

9. The computer system of claim 6, wherein the power consumption information of the plurality of server computers includes power consumption of corresponding racks that contain the plurality of server computers.

10. The computer system of claim 6, wherein the predicted differences in power consumption of the data center are received from a regressor of the machine learning model.

* * * * *